(12) United States Patent
Kao et al.

(10) Patent No.: US 11,579,398 B2
(45) Date of Patent: Feb. 14, 2023

(54) OPTICAL MEMBER DRIVING MECHANISM

(71) Applicant: TDK TAIWAN CORP., Taoyuan (TW)

(72) Inventors: Chien-Yu Kao, Taoyuan (TW);
Chen-Hsien Fan, Taoyuan (TW);
Chih-Wei Weng, Taoyuan (TW);
Chao-Chang Hu, Taoyuan (TW);
Che-Wei Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 396 days.

(21) Appl. No.: 16/729,029

(22) Filed: Dec. 27, 2019

(65) Prior Publication Data
US 2020/0209511 A1 Jul. 2, 2020

Related U.S. Application Data

(60) Provisional application No. 62/785,593, filed on Dec. 27, 2018.

(30) Foreign Application Priority Data

Dec. 20, 2019 (EP) ..................................... 19218896

(51) Int. Cl.
*G02B 7/08* (2021.01)
*H04N 5/225* (2006.01)
(Continued)

(52) U.S. Cl.
CPC ................. *G02B 7/02* (2013.01); *G02B 3/14* (2013.01); *G02B 6/3514* (2013.01); *G02B 7/08* (2013.01);
(Continued)

(58) Field of Classification Search
CPC .......... G02B 7/04; G02B 7/09; G02B 7/1805; G02B 7/182; G02B 13/0075;
(Continued)

(56) References Cited

U.S. PATENT DOCUMENTS

2009/0129764 A1* 5/2009 Hayashi ............. H04N 5/23287
359/557
2016/0154250 A1* 6/2016 Miller .................... G02B 7/023
359/557
(Continued)

FOREIGN PATENT DOCUMENTS

WO WO-2016009734 A1 * 1/2016 ............. G02B 1/118

*Primary Examiner* — Marin Pichler
(74) *Attorney, Agent, or Firm* — Muncy, Geissler, Olds & Lowe, P.C.

(57) ABSTRACT

An optical element driving mechanism is provided and includes a movable portion and a fixed portion. The movable portion includes a carrier for carrying an optical member with a first optical axis. The fixed portion has a top surface, a first side surface and a second side surface. The top surface extends in a direction that is parallel to the first optical axis. The first side surface and the second side surface extend in a direction that is not parallel to the first optical axis from the edge of the top surface and face different sides of the optical member. The shortest distance between the optical member and the first side surface is shorter than the shortest distance between the optical member and the second side surface.

18 Claims, 9 Drawing Sheets

(51) Int. Cl.
| | |
|---|---|
| *H04N 5/232* | (2006.01) |
| *G02B 7/02* | (2021.01) |
| *G02B 3/14* | (2006.01) |
| *G02B 6/35* | (2006.01) |
| *G02B 7/182* | (2021.01) |
| *G02B 26/08* | (2006.01) |
| *G02B 7/09* | (2021.01) |
| *G02B 27/64* | (2006.01) |
| *G02B 23/08* | (2006.01) |

(52) U.S. Cl.
CPC ............... *G02B 7/09* (2013.01); *G02B 7/182* (2013.01); *G02B 26/0816* (2013.01); *G02B 27/646* (2013.01); *H04N 5/2254* (2013.01); *H04N 5/2257* (2013.01); *H04N 5/2259* (2013.01); *H04N 5/23287* (2013.01); *G02B 23/08* (2013.01); *G03B 2205/0069* (2013.01)

(58) Field of Classification Search
CPC .............. G02B 26/0816; G02B 26/085; G02B 27/0068; G02B 27/64; G02B 27/646; G02B 5/005; G02B 13/0065; G02B 27/0018; H04N 5/2253; H04N 5/2254; H04N 5/2257; G03B 2205/0015; G03B 2205/0069; G03B 2205/0007; G03B 3/10; G03B 5/00; G03B 11/045; G03B 17/02; G03B 13/36
See application file for complete search history.

(56) References Cited

U.S. PATENT DOCUMENTS

2017/0329151 A1\* 11/2017 Hu .......................... G02B 13/02
2018/0367714 A1\* 12/2018 Im ........................ H04N 5/2252

\* cited by examiner

OPTICAL MEMBER DRIVING MECHANISM

CROSS REFERENCE TO RELATED APPLICATIONS

This application claims the benefit of U.S. Provisional Application No. 62/785,593, filed Dec. 27, 2018, and claims priority of European Patent Application No. 19218896.9, filed Dec. 20, 2019, the entirety of which are incorporated by reference herein.

BACKGROUND

Technical Field

The disclosure relates to an optical member driving mechanism, and in particular to an optical member driving mechanism including a reflection member that is disposed in the housing of the optical member driving mechanism.

Description of the Related Art

With the development of technology, many electronic devices (such as smartphones and digital cameras) nowadays perform the functions of a camera or video recorder. The use of such electronic devices has become increasingly widespread, and these electronic devices have been designed for convenience and miniaturization to provide users with more choices.

Electronic devices with a camera or video function usually have a lens driving module disposed therein to drive a lens to move along an optical axis. Therefore, an autofocus (AF) and/or optical image stabilization (OIS) function is achieved. Light may pass through the lens and form an image on a photosensitive member.

However, during forming an optical image, external noise usually enters the photosensitive member due to reflection. As a result, the image quality is usually not good enough to meet the requirement of the image quality for users. Therefore, how to solve the aforementioned problem has become an important topic.

BRIEF SUMMARY

The present disclosure provides an optical member driving mechanism. The optical member driving mechanism includes a movable portion and a fixed portion. The movable portion includes a carrier for carrying an optical member with a first optical axis. The movable portion is movable relative to the fixed portion. The fixed portion includes a top surface, a first side surface and a second side surface. The top surface extends in a direction that is parallel to the first optical axis. The first side surface extends in a direction that is not parallel to the first optical axis from the edge of the top surface and faces the outlet end of the optical member. The second side surface extends in a direction that is not parallel to the first optical axis from the edge of the top surface and faces the incident end of the optical member. The shortest distance between the optical member and the first side surface is shorter than the shortest distance between the optical member and the second side surface.

In an embodiment, the optical member further has a first section and a second section, the first section is closer to the incident end of the optical member than the second section, the first section and the second section are arranged along the first optical axis, and in a direction that is perpendicular to the first optical axis, the largest size of the first section is greater than the largest size of the second section.

In an embodiment, the housing further has: a first opening, a second opening and a third opening. The first opening is located on the first side surface. The second opening is located on the second side surface, wherein the first optical axis passes through the first opening and the second opening. The third opening is located on the top surface, wherein the distance between the third opening and the first opening is longer than the distance between the third opening and the second opening.

In an embodiment, the housing further has a third side surface and a plurality of holes that are located on the third side surface, and the third side surface is not parallel to the first side surface or the second side surface. In an embodiment, the optical member driving mechanism further includes a reflection member that is disposed in the housing, wherein the shortest distance between the reflection member and the first side surface is longer than the shortest distance between the reflection member and the second side surface.

In an embodiment, the reflection member has a second optical axis that is not parallel to the first optical axis. In an embodiment, the fixed portion further includes a frame that is disposed between the carrier and the housing, and when viewed in the direction that is parallel to the first optical axis, the frame and the carrier at least partially overlap. In an embodiment, the frame has a first jagged surface disposed to face the base.

In an embodiment, the carrier further includes a protruding portion that protrudes from the optical member and extends towards the base, and when viewed in the direction that is parallel to the first optical axis, the protruding portion and the optical member at least partially overlap. In an embodiment, the protruding portion further has a second jagged surface disposed to face the base.

In an embodiment, the optical member driving mechanism further includes an electromagnetic driving assembly that drives the movable portion to move relative to the fixed portion. The electromagnetic driving assembly comprises a magnetic member and a coil, one of which is disposed on the movable portion, and the other is disposed on the fixed portion. In an embodiment, the magnetic member is a tripolar magnet.

In an embodiment, the fixed portion further includes a frame that is disposed between the carrier and the housing, and when viewed in a direction that is perpendicular to the first optical axis, the magnetic member is exposed from the frame. In an embodiment, the optical member driving mechanism further includes a first bonding material and a second bonding material, wherein the first bonding material is bonded between the housing and the frame, the second bonding material is bonded between the magnetic member and the frame, and the first bonding material is different from the second bonding material.

In an embodiment, the base further includes a first barrier and a second barrier, the first barrier and the second barrier protrude towards the top surface, and the shortest distance between the first barrier and the first side surface is shorter than the shortest distance between the second barrier and the first side surface. In an embodiment, the base further includes a stopping portion that is disposed between the carrier and the second side surface. In an embodiment, the base further includes a metallic member that is embedded in the stopping portion.

In an embodiment, the optical member driving mechanism further includes an extinction sheet that is disposed between the carrier and the optical member. In an embodiment, when viewed in a direction that is perpendicular to the first optical axis, the carrier is partially exposed from the optical member, and the shortest distance between the exposed portion of the optical member and the first side surface is longer than the shortest distance between the unexposed portion of the optical member and the first side surface.

In an embodiment, the optical member driving mechanism further includes a sensing assembly for detecting the movement of the movable portion relative to the fixed portion, wherein when viewed in a direction that is perpendicular to the first optical axis, the sensing assembly and the optical member partially overlap.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical member driving mechanisms of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

In addition, relative terms such as "lower" or "bottom," "upper" or "top" may be used in the following embodiments in order to describe the relationship between one element and another element in the figures. It should be appreciated that if the device shown in the figures is flipped upside-down, the element located on the "lower" side may become the element located on the "upper" side.

It should be understood that although the terms "first," "second," "third," etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exactly the same as the description herein. It should be noted that unless defined specifically, even if the above terms are not recited in the description, it should be read as the same meaning as those approximate terms are recited.

Figure 1:
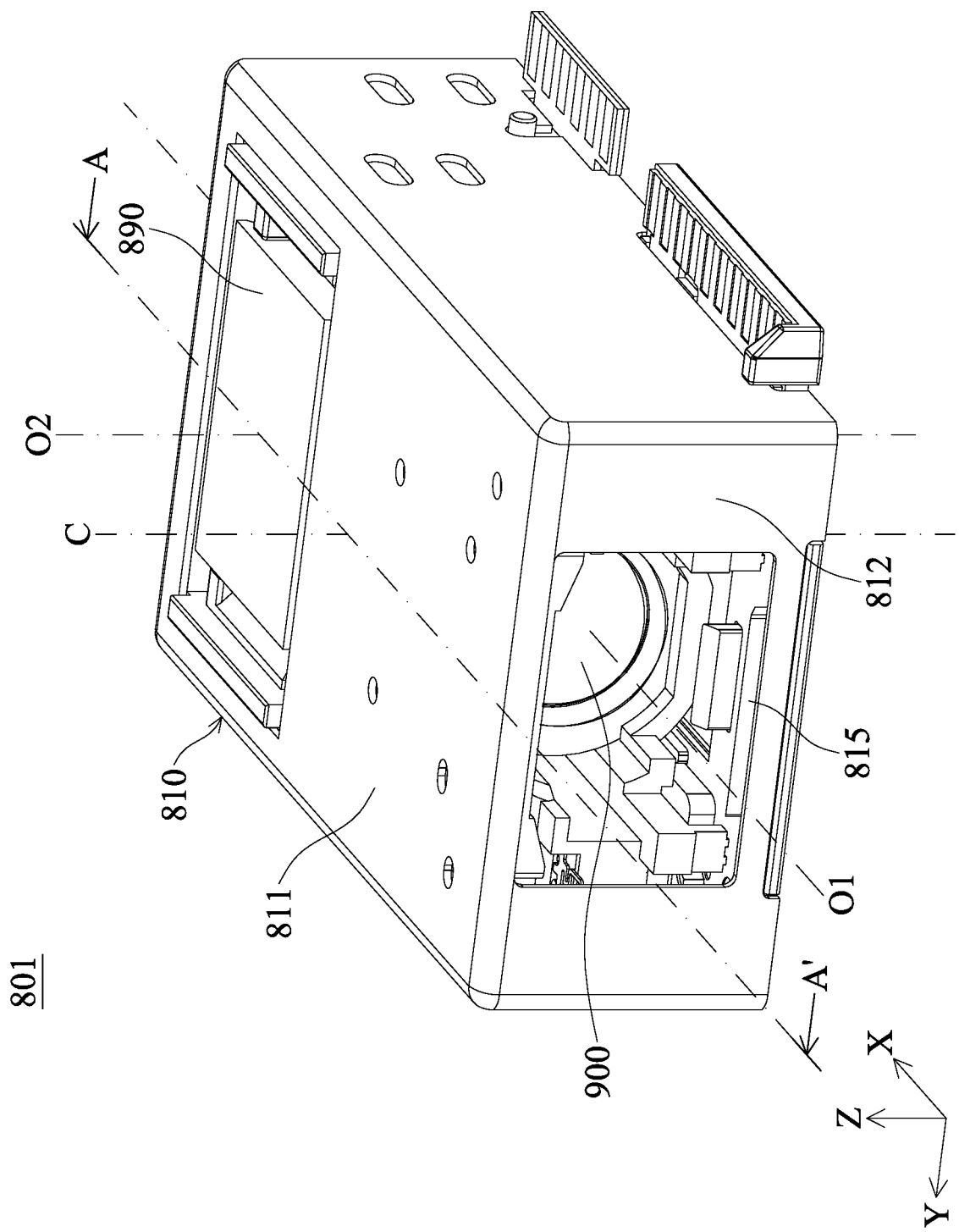
FIG. 1 is a perspective view illustrating an optical member driving mechanism in accordance with an embodiment of the present disclosure.

FIG. 1 is a schematic perspective view illustrating an optical member driving mechanism 801 in accordance with an embodiment of the present disclosure. It should be noted that, in this embodiment, the optical member driving mechanism 801 may be, for example, disposed in the electronic devices with camera function for driving an optical member 900, and can perform an autofocus (AF) and/or optical image stabilization (OIS) function.

As shown in FIG. 1, the optical member driving mechanism 801 has a central axis C that is substantially parallel to the Z axis. The optical member driving mechanism 801 has a first optical axis O1 that is substantially parallel to the X axis. The optical member driving mechanism 801 includes a housing 810 which has a top surface 811 and a first side surface 812. The top surface 811 extends in a direction that is parallel to the first optical axis O1 (i.e. the X-Y plane). The first side surface 812 extends from an edge of the top surface 811 along a direction (the Z axis) that is perpendicular to the first optical axis O1. In some embodiments, the first side surface 812 extends from the edge of the top surface 811 along a direction that is not parallel to the first optical axis O1. In addition, the housing 810 has a first opening 815 that is located on the first side surface 812, and the first optical axis O1 may pass through the first opening 815.

The optical member driving mechanism 801 further includes a reflection member 890 that is disposed in the housing 810 of the optical member driving mechanism 801, and the reflection member 890 has a second optical axis O2 that is substantially parallel to the Z axis. In the present embodiment, the first optical axis O1 is substantially perpendicular to the second optical axis O2, but it is not limited thereto. In some embodiments, the first optical axis O1 is not parallel to the second optical axis O2. As a result, light may enter the optical member driving mechanism 801 along the second optical axis O2, and the direction of the light may be changed by the reflection member 890, such that the light may pass through the optical member 900 along the first optical axis O1. After the light passes through the optical member 900, it may travel to an image sensor (not shown) that is disposed out of the optical member driving mechanism 801, and thereby an image may be generated on the electronic device.

Figure 2:
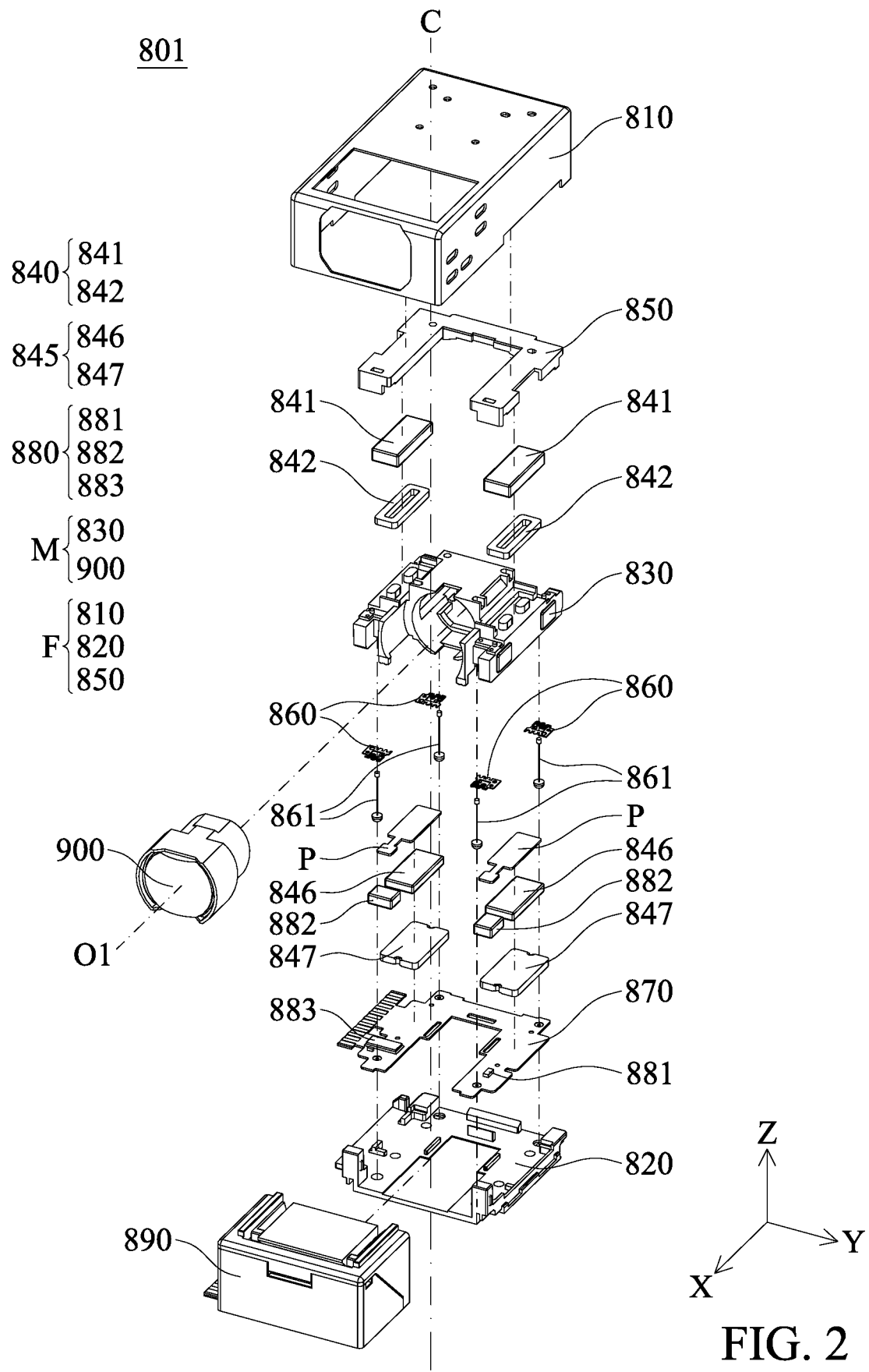
FIG. 2 is an exploded view illustrating the optical member driving mechanism shown in FIG. 1.

FIG. 2 is an exploded view illustrating the optical member driving mechanism 801 shown in FIG. 1. In the present embodiment, the optical member driving mechanism 801 has a substantial rectangular structure. The optical member driving mechanism 801 mainly includes a fixed portion F, a movable portion M, a plurality of first elastic members 860, a plurality of second elastic members 861, a first electromagnetic driving assembly 840 and a second electromagnetic driving assembly 845. The fixed portion F includes a housing 810, a base 820, a frame 850, and a circuit component 870.

The housing 810 is disposed on the base 820, and protect the elements disposed inside the optical member driving mechanism 801. In some embodiments, the housing 810 is made of metal or another material with sufficient hardness to provide good protection. The frame 850 is disposed in and affixed to the housing 810. The circuit component 870 is disposed on the base 820 for transmitting electric signals, performing the autofocus (AF) and/or optical image stabilization (OIS) function. For example, the optical member driving mechanism 801 may control the position of the optical member 900 based on the aforementioned electric signals so as to form an image.

The movable portion M is movable relative to the fixed portion F. The movable portion M mainly includes a carrier 830 which carries the optical member 900. As shown in FIG. 2, the carrier 830 is movably connected to the housing 810 and the base 820. The first elastic members 860 are disposed on the carrier 830. The second elastic members 861 extend in a vertical direction (the Z axis), and are connected to the first elastic members 860 and the base. As a result, the carrier 830 may be connected to the base 820 via the first elastic members 860 and the second elastic members 861. For example, the first elastic members 860 and the second elastic members 861 are made of metal or another suitable elastic material.

The first electromagnetic driving assembly 840 includes first magnetic members 841 and first driving coils 842. The first magnetic members 841 may be disposed on the frame 850, and the corresponding first driving coils 842 are disposed on the carrier 830. When current is applied to the first driving coils 842, an electromagnetic driving force may be generated by the first driving coils 842 and the first magnetic members 841 (i.e. the first electromagnetic driving assembly 840) to drive the carrier 830 and the optical member 900 carried therein to move along a horizontal direction (the X-Y plane) relative to the base 820, performing the autofocus (AF) and/or optical image stabilization (OIS) function.

In addition, the second electromagnetic driving assembly 845 includes second magnetic members 846 and second driving coils 847. The second magnetic members 846 may be disposed on the carrier 830, and the corresponding second driving coils 847 are disposed on the base 820. For example, the second driving coils 847 may be flat-plate coils such that the difficulty and the required time for assembly may be reduced. When a current is applied to the second driving coils 847, an electromagnetic driving force may be generated by the second electromagnetic driving assembly 845 to drive the carrier 830 and the optical member 900 carried therein to move along the first optical axis O1 (the X axis) relative to the base 820, performing the autofocus (AF) function. The carrier 830 may be movably suspended between the frame 850 and the base 820 by the electromagnetic driving force of the first electromagnetic driving assembly 840, the second electromagnetic driving assembly 845 and the force exerted by the first elastic members 860, the second elastic members 861. Furthermore, a magnetic permeable plate P is disposed on the second magnetic members 846 for concentrating the magnetic field of the second magnetic members 846 so that the efficiency of the second electromagnetic driving assembly 845 may be improved. In some embodiments, the magnetic permeable plate P may be made of metal or another material with sufficient magnetic permeability.

The sensing assembly 880 includes a sensor 881, a reference member 882 and an integrated circuit (IC) component 883. In the present embodiment, the sensor 881 and the integrated circuit component 883 are disposed on the base 820, and the reference member 882 is disposed in the carrier 830. A plurality of reference members 882 may be disposed. For example, the reference member 882 is a magnetic member, the sensor 881 may detect the change of the magnetic field of the reference member 882, and the position of the carrier 830 (and the optical member 900) may be determined by the integrated circuit component 883. In some embodiments, one of the sensor 881 and the reference member 882 is disposed on the fixed portion F, and the other of the sensor 881 and the reference member 882 is disposed on the movable portion M.

Figure 3:
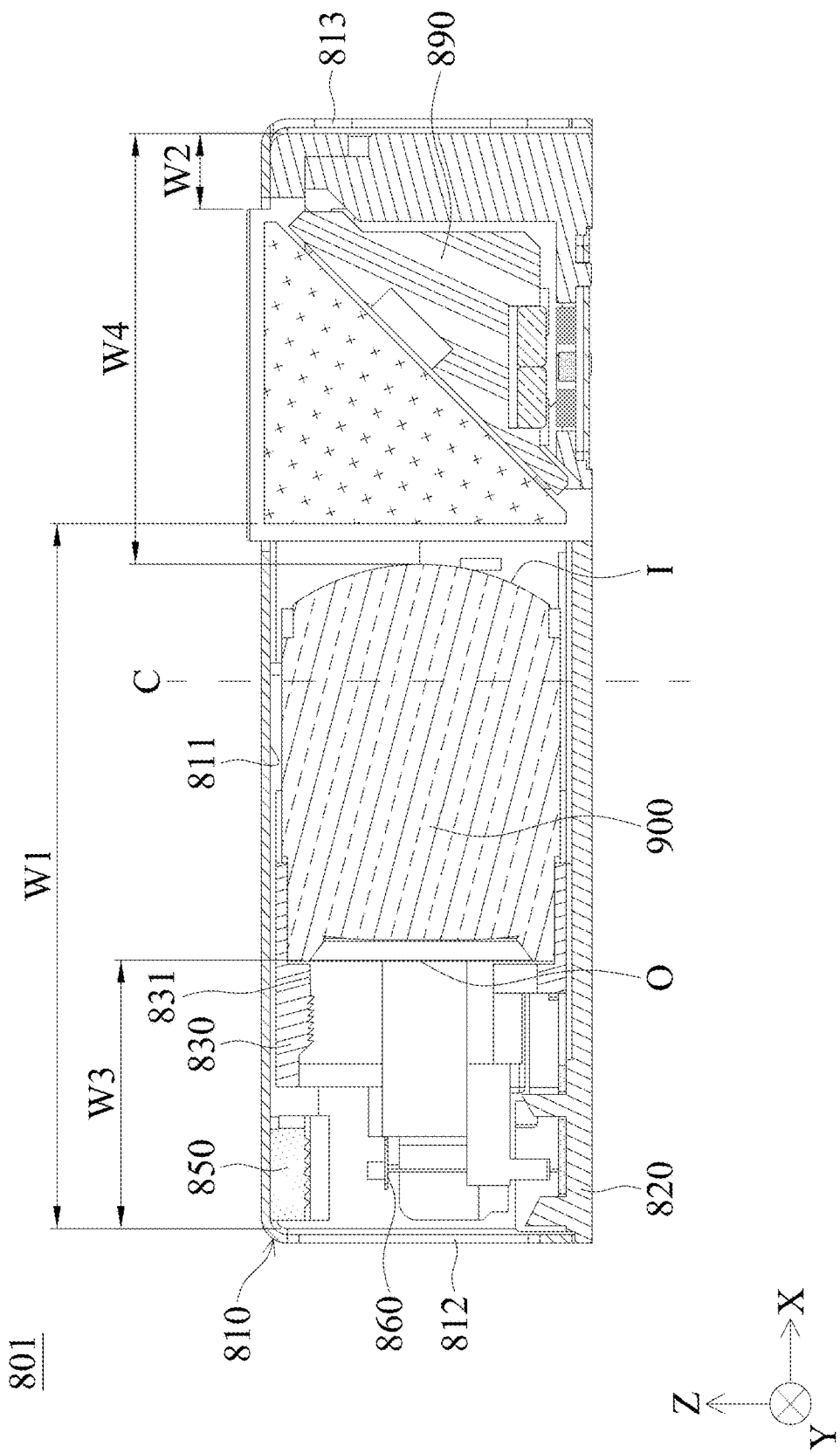
FIG. 3 is a cross-sectional view illustrating along line A-A shown in FIG. 1.

FIG. 3 is a cross-sectional view illustrating along line A-A shown in FIG. 1. As shown in FIG. 3, the optical member 900 has an incident end I and an outlet end O. In the present embodiment, the light may enter the optical member 900 from the incident end I along the first optical axis O1, and exit the optical member 900 from the outlet end O. In the present embodiment, the first side surface 812 faces the outlet end O of the optical member 900, and the second side surface 813 faces the incident end I of the optical member 900.

Since the reflection member 890 is also disposed in the housing 810, the optical member 900 is not located at the center of the optical member driving mechanism 801. In the present embodiment, the reflection member 890 is closer to the second side surface 813 than the optical member 900, and the optical member 900 is closer to the first side surface 812 than the reflection member 890. In other words, the shortest distance (a first distance W1) between the reflection member 890 and the first side surface 812 is longer than the shortest distance (a second distance W2) between the reflection member 890 and the second side surface 813. The shortest distance (a third distance W3) between the optical member 900 and the first side surface 812 is shorter than the shortest distance (a fourth distance W4) between the optical member 900 and the second side surface 813. In the present embodiment, the frame 850 is disposed between the carrier 830 and the housing 810, and when viewed in a direction (the X axis) that is parallel to the first optical axis O1, the frame 850 and the carrier 830 at least partially overlap.

Figure 4:
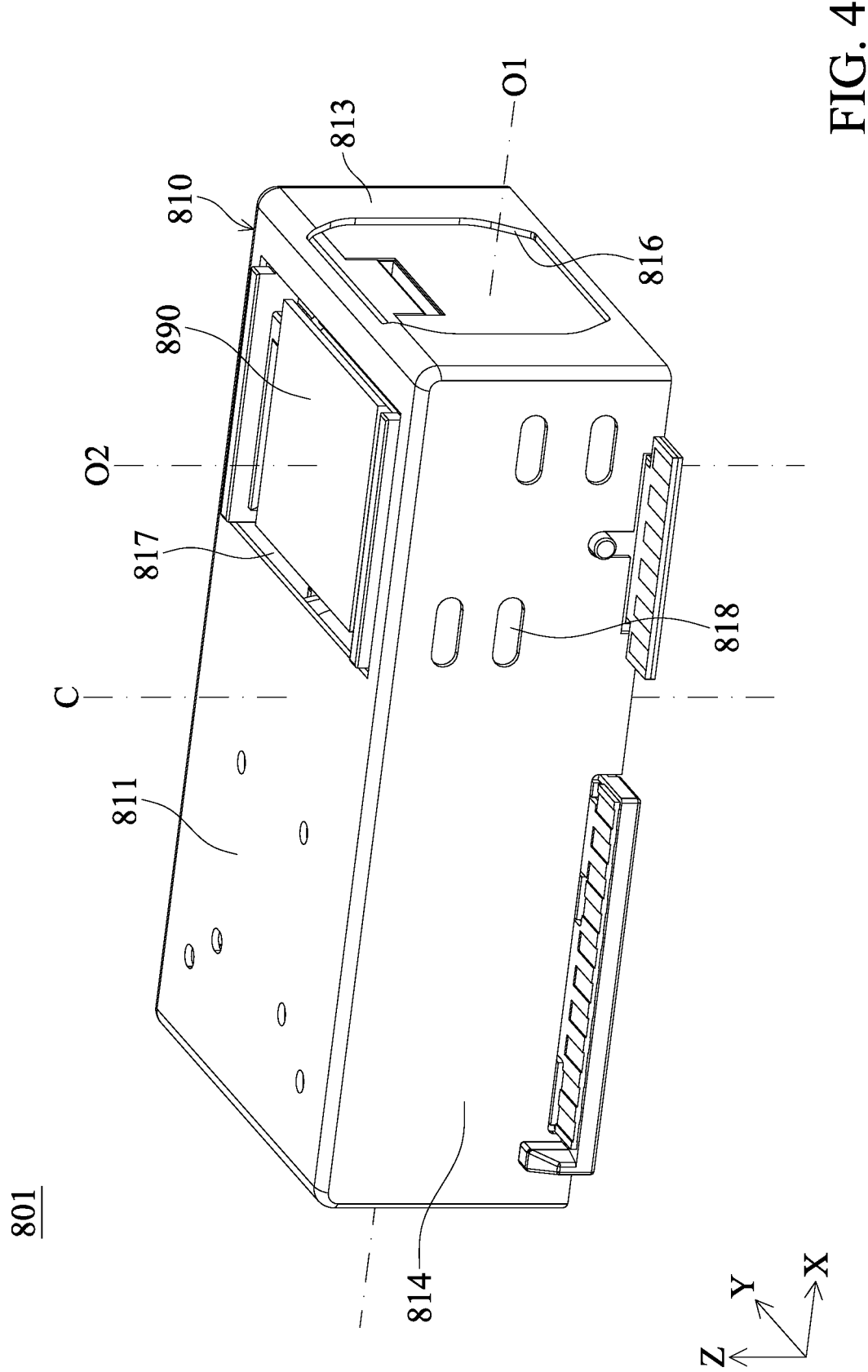
FIG. 4 is a perspective view illustrating the optical member driving mechanism shown in FIG. 1 when viewed in another direction.

FIG. 4 is a perspective view illustrating the optical member driving mechanism 801 shown in FIG. 1 when viewed in another direction. As shown in FIG. 4, the housing further has a second side surface 813 and a third side surface 814. In the present embodiment, the second side surface 813 extends from an edge of the top surface 811 along a direction (the Z axis) that is perpendicular to the first optical axis O1. In some embodiments, the second side surface 813 extends from the edge of the top surface 811 along a direction that is not parallel to the first optical axis O1. The housing 810 has a second opening 816 that is located on the second side surface 813, and the first optical axis O1 may pass through the second opening 816. In other words, the first side surface 812 and the second side surface 813 are substantially parallel to each other.

The third side surface 814 extends from an edge of the top surface 811 along a direction (the Z axis) that is perpendicular to the first optical axis O1, and is located between the first side surface 812 and the second side surface 813. In the present embodiment, the third side surface 814 is perpendicular to the first side surface 812 and the second side surface 813. In some embodiments, the third side surface 814 is not parallel to the first side surface 812 or the second side surface 813. A plurality of holes 818 may be disposed on the third side surface 814 and correspond to the reflection member 890. For example, an adhesive (not shown) may be disposed in the holes 818, such that the reflection member 890 may be affixed in the optical member driving mechanism 801.

In addition, a third opening 817 may be formed on the top surface 811, and correspond to the reflection member 890, such that the light is able to enter the optical member 900 located inside the optical member driving mechanism 801. Since the reflection member 890 is disposed near the first side surface 812, the third opening 817 may be closer to the second opening 816 instead of the first opening 815. In other words, the distance between the third opening 817 and the first opening 815 may be greater than the distance between the third opening 817 and the second opening 816.

It should be noted that in the present embodiment, the light would not actually pass through the second opening 816. However, during the assembly of the optical member driving mechanism 801, the optical member 900 may be disposed in the optical member driving mechanism 801 via the second opening 816 first, and then the reflection member 890 is disposed in the optical member driving mechanism 801. An optical calibration process is performed to the optical member 900 and the reflection member 890, and thereby the yield of the optical member driving mechanism 801 may be increased. The above design may simplify the manufacturing process.

Figure 5:
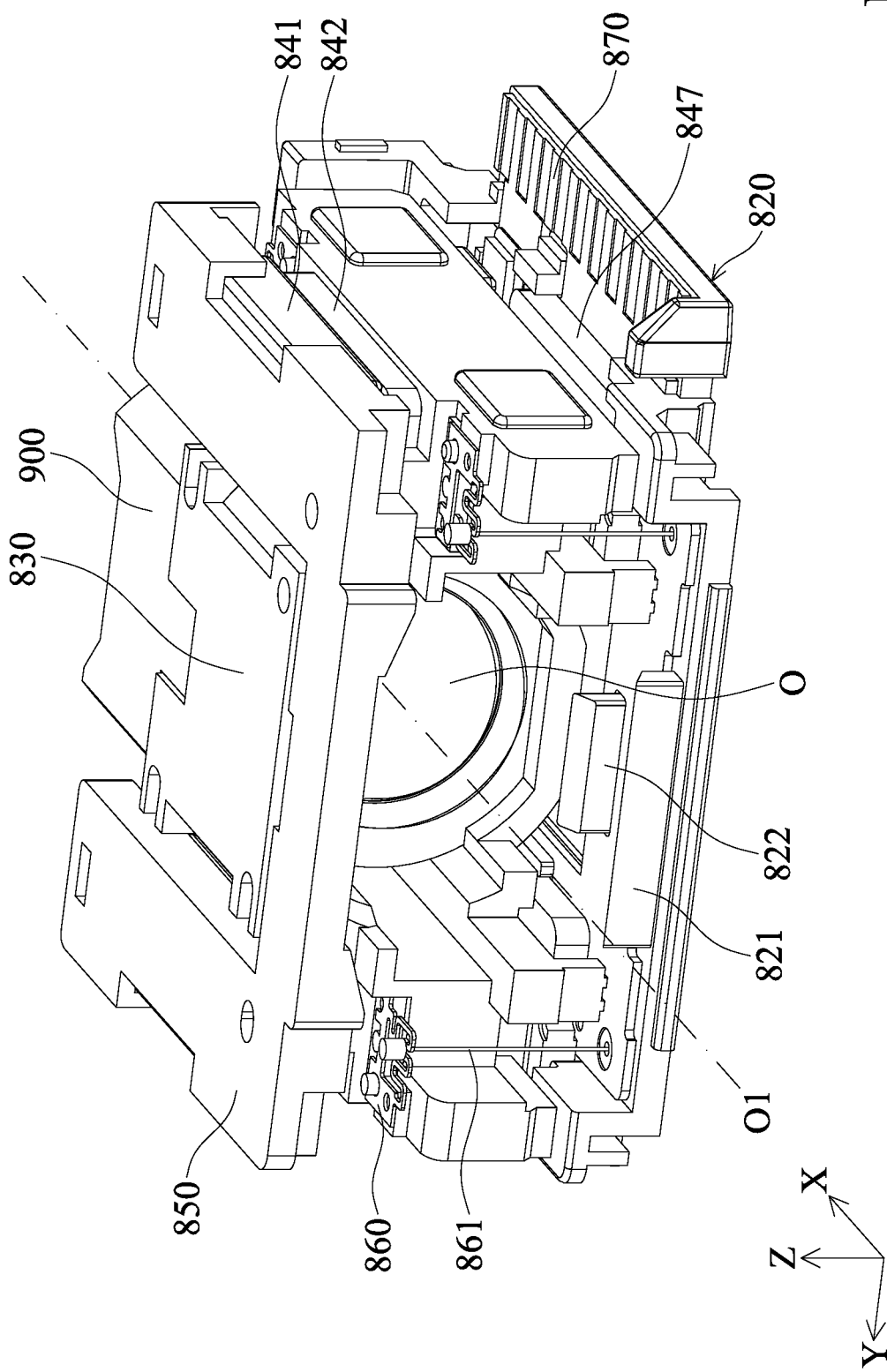
FIG. 5 is a perspective view illustrating the interior structure of the optical member driving mechanism in accordance with an embodiment of the present disclosure.

FIG. 5 is a perspective view illustrating the interior structure of the optical member driving mechanism 801 when viewed in the outlet end O of the optical member 900. It should be appreciated that in order to clearly show the interior structure of the optical member driving mechanism 801, the housing 810 and the reflection member 890 are not illustrated in the present embodiment. As shown in FIG. 5, the base 820 further includes a first barrier 821 and a second barrier 822, wherein the first barrier 821 and the second barrier 822 protrude towards the top surface 811 of the housing 810, and the shortest distance between the first barrier 821 and the first side surface 812 is shorter than the shortest distance between the second barrier 822 and the first side surface 812. Thanks to the arrangement of the first barrier 821 and the second barrier 822, light is prevented from entering the image sensor due to it being reflected by the housing 810 and the circuit component 870. It should be noted that, although the first barrier 821 and the second barrier 822 are illustrated in the present embodiment, this merely serves as an example. Those skilled in the art may adjust the positions or number of barriers. In some embodiments, a jagged structure or any other suitable irregular structure may be on the base 820 (such as on the first barrier 821 and/or the second barrier 822) by a laser engraving process, and thereby the reflection inside the optical member driving mechanism 801 may be reduced.

In addition, in the present embodiment, when viewed in a direction (the Z axis) that is perpendicular to the first optical axis O1, the first magnetic members 841 are partially exposed from the frame 850. In the present embodiment, the first magnetic members 841 are tripolar magnets such that the assembly process may be simplified, and the assembly precision and the push strength may be enhanced. However, the present disclosure is not limited thereto. In some other embodiments, each of the first magnetic members 841 may also be a combination of three magnets. Furthermore, the optical member driving mechanism 801 further includes a first bonding material and a second bonding material (not shown), wherein the first bonding material is bonded between the housing 810 and the frame 850, the second bonding material is bonded between the first magnetic members 841 and the frame 850. Since in some embodiments, the housing 810 and the first magnetic members 841 are affixed to the frame 850 by different processes, the first bonding material is different from the second bonding material. For example, the first bonding material is a light-curing adhesive, and thereby after the housing 810 and the frame 850 are affixed, subsequent assembly process (such as the process of affixing the first magnetic members 841 and the frame 850) may be performed in a short time.

Figure 6:
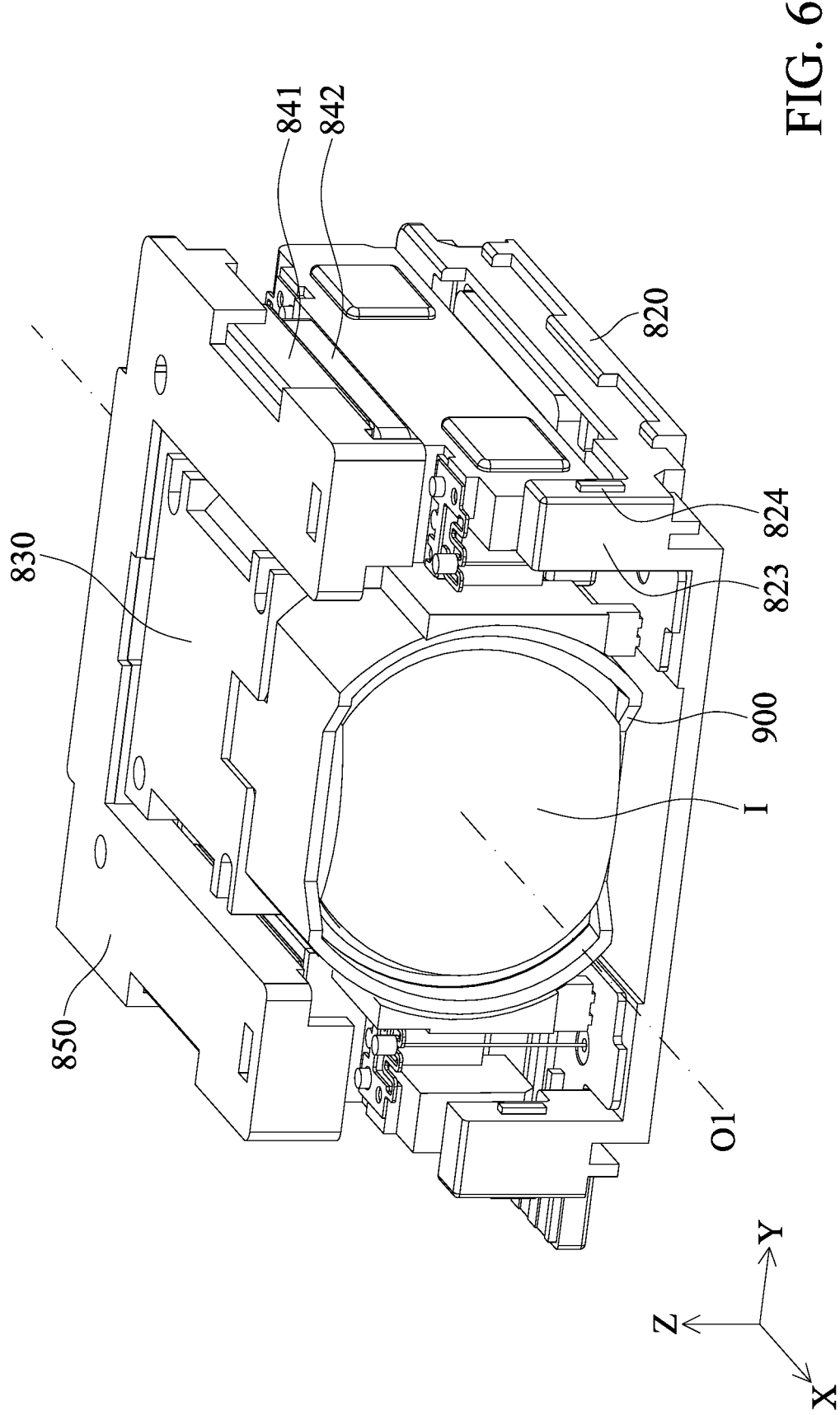
FIG. 6 is a perspective view illustrating the interior structure of the optical member driving mechanism shown in FIG. 5 when viewed in another direction.

FIG. 6 is a perspective view illustrating the interior structure of the optical member driving mechanism 801 when viewed in the incident end I of the optical member 900. As shown in FIG. 6, the base further includes a stopping portion 823 that is disposed between the carrier 830 and the second side surface 813 (as shown in FIG. 4). Thanks to the arrangement of the stopping portion 823, the moving range of the carrier 830 may be limited. As a result, collisions between the carrier 830 the reflection member 890 may be avoided, and the reflection member 890 and/or the optical member 900 can remain undamaged. In addition, a metallic member 824 is embedded into the stopping portion 823, enhancing the structural strength of the stopping portion 823. Therefore, the stopping portion 823 is prevented from multiple collisions and remains undamaged.

Figure 7:
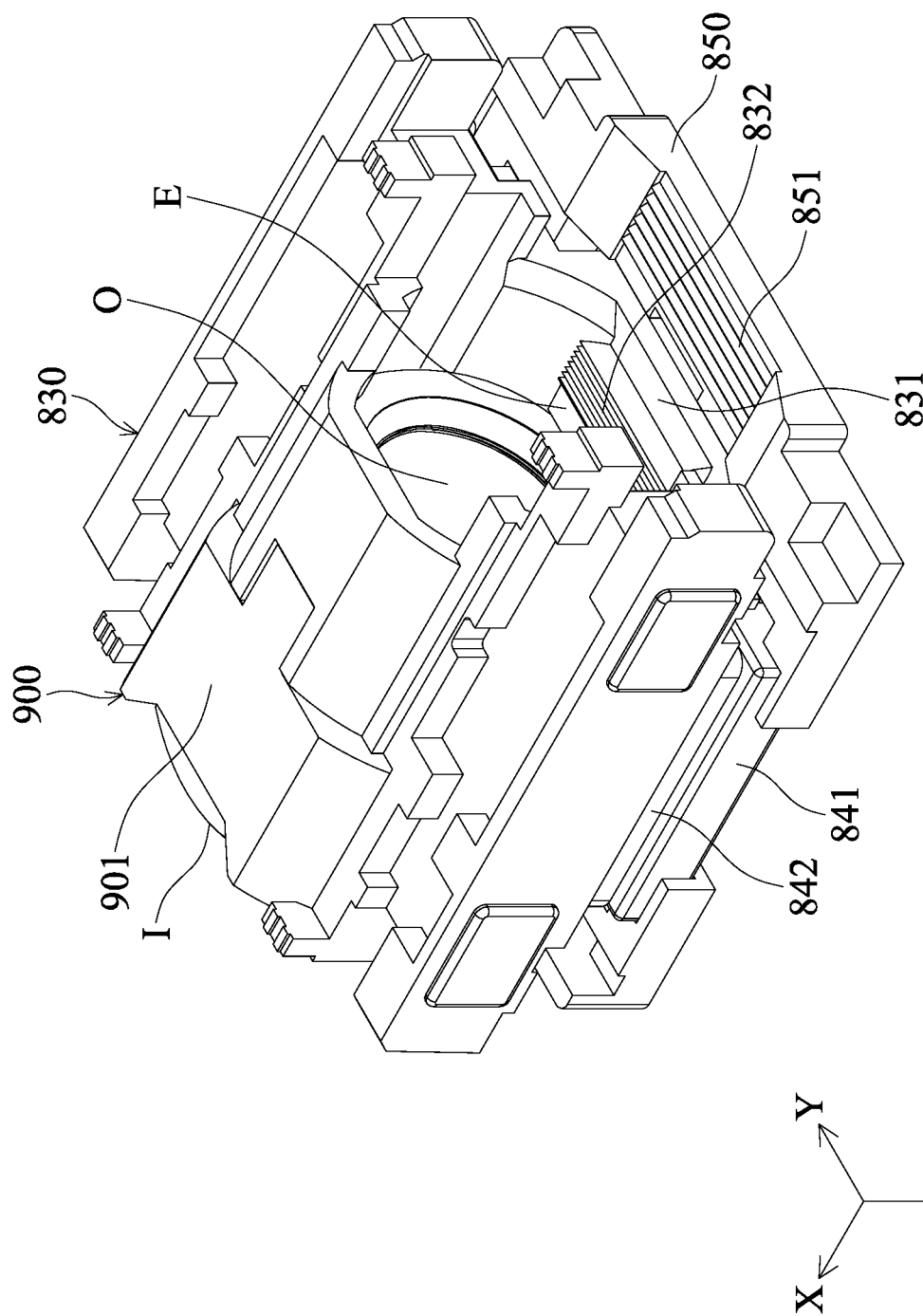
FIG. 7 is a perspective view illustrating the interior structure of the optical member driving mechanism in accordance with an embodiment of the present disclosure.

FIG. 7 is a perspective view illustrating the interior structure of the optical member driving mechanism 801 in accordance with an embodiment of the present disclosure. It should be noted that in order to clearly show the structure of the frame 850 and the carrier 830, the frame 850, the carrier 830 and the optical member 900 are illustrated upside-down. That is, the upper side of FIG. 7 is towards the base 820, and the lower side is towards the top surface 811 of the housing 810. As shown in FIG. 7, the frame 850 has a first jagged surface 851 that is disposed to face the base 820. In addition, the carrier 830 further includes a protruding portion 831 that protrudes from the optical member 900 and extends towards the base 820. When viewed in a direction (the X axis) that is parallel to the first optical axis O1, the protruding portion 831 and the optical member 900 at least partially overlap. The protruding portion 831 further has a second jagged surface 832 that is disposed to face the base 820.

Thanks to the arrangement of the protruding portion 831, the possibility that the light directly illuminates the inner surface of the metallic housing 810 may be reduced, such that the light reflection may also be reduced. Furthermore, the first jagged surface 851 and the second jagged surface 832 are configured for weakening the intensity of light reflection after the light illuminates the above jagged surfaces. Since the possibility and/or intensity of the light reflected inside the optical member driving mechanism 801 may be reduced, noise may be less likely to enter the image sensor due to reflection. Therefore, image quality may be unaffected.

For example, the jagged structure on the first jagged surface 851 and/or the second jagged surface 832 may be formed by a laser engraving process. In some embodiments, the size in the Z axis of the above jagged structures may be in a range from 0.1 mm to 0.4 mm, but it is not limited thereto. In addition, the jagged structures may be formed as regular structures or irregular structures as required. It should be noted that although the first jagged surface 851 and the second jagged surface 832 are both disposed in the present embodiment, it merely serves as an example. Those skilled in the art may determine whether the first jagged surface 851 and/or the second jagged surface 832 are disposed, or adjust the position of the first jagged surface 851 and/or the second jagged surface 832.

The optical member driving mechanism 801 further includes an extinction sheet E that is disposed between the carrier 830 and the optical member 900. More specifically, the extinction sheet E is disposed in a gap between the carrier 830 and the optical member 900. In some embodiments, the extinction sheet E may also be disposed on the second jagged surface 832, or disposed between the first barrier 821 and the second barrier 822, but it is not limited thereto. Thanks to the arrangement of the extinction sheet E, the reflection of the noise may be effectively reduced, avoiding the noise entering the image sensor. For example, the extinction sheet E may be made of resin or any other suitable material, and has a porous structure. In some embodiments, the extinction sheet E may lower the reflectivity of the light with a wavelength between 250 nm and 2500 nm below 1.6%. In some embodiments, the thickness of the extinction sheet E may be in a range from 0.1 mm to 0.5 mm.

Figure 8:
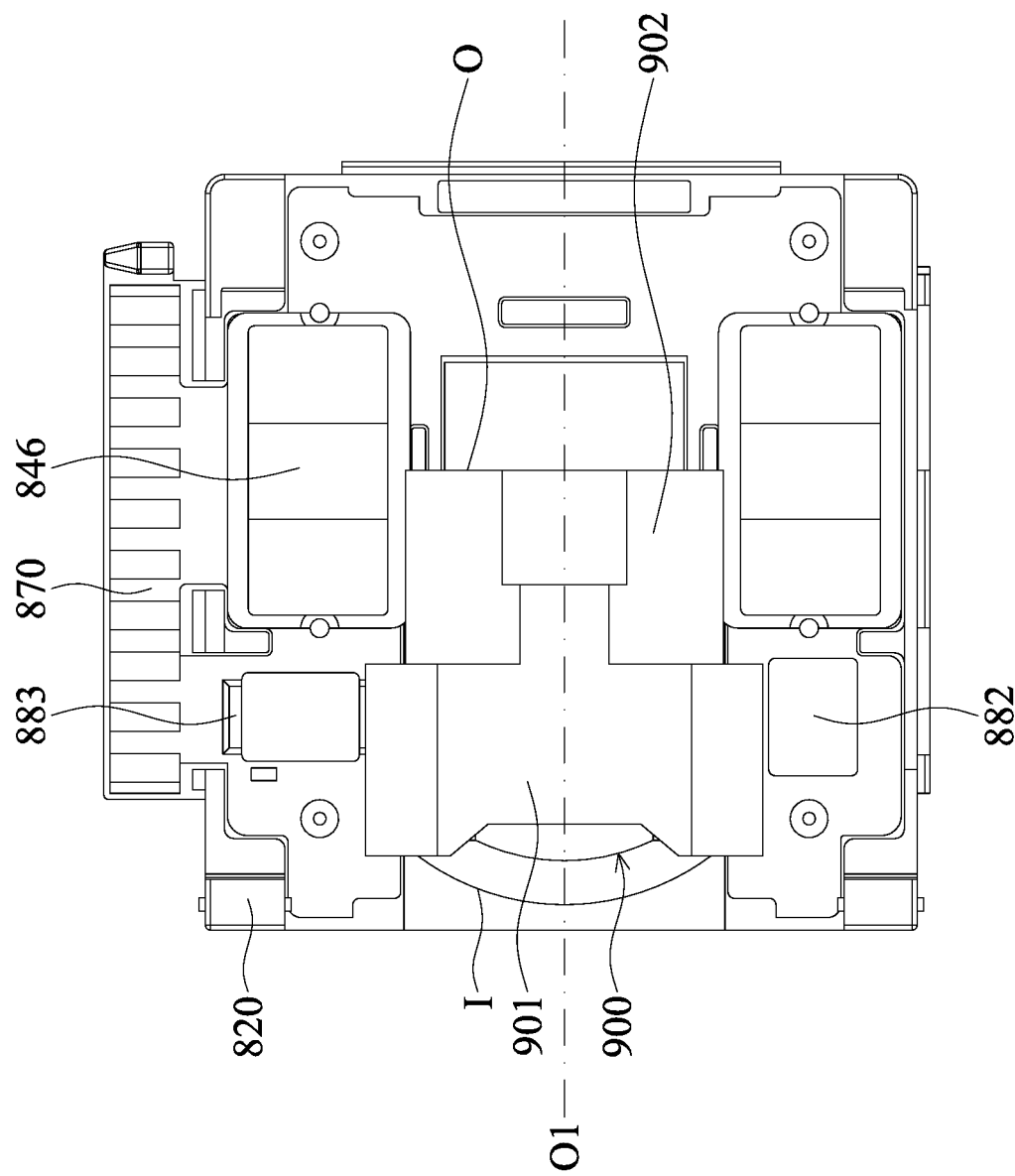
FIG. 8 is a top view illustrating the interior structure of the optical member driving mechanism in accordance with an embodiment of the present disclosure.

In addition, the optical member 900 further has a first section 901 and a second section 902 (as shown in FIG. 8), wherein the first section 901 is closer to the incident end I of the optical member 900. The first section 901 and the second section 902 are arranged along the first optical axis O1, wherein the first section 901 is closer to the second side surface 813 than the second section 902. In other words, the shortest distance between the first section 901 and the second side surface 813 is shorter than the shortest distance between the second section 902 and the second side surface 813. In a direction (the Y axis) that is perpendicular to the first optical axis O1, the largest size of the first section 901 is greater than the largest size of the second section 902. That is, the width of the first section 901 is greater than the width of the second section 902 in the Y axis. Since the size of the first section 901 is larger, the carrier 830 may cover the second section 902, and the first section 901 of the optical member 900 may be exposed.

Figure 9:
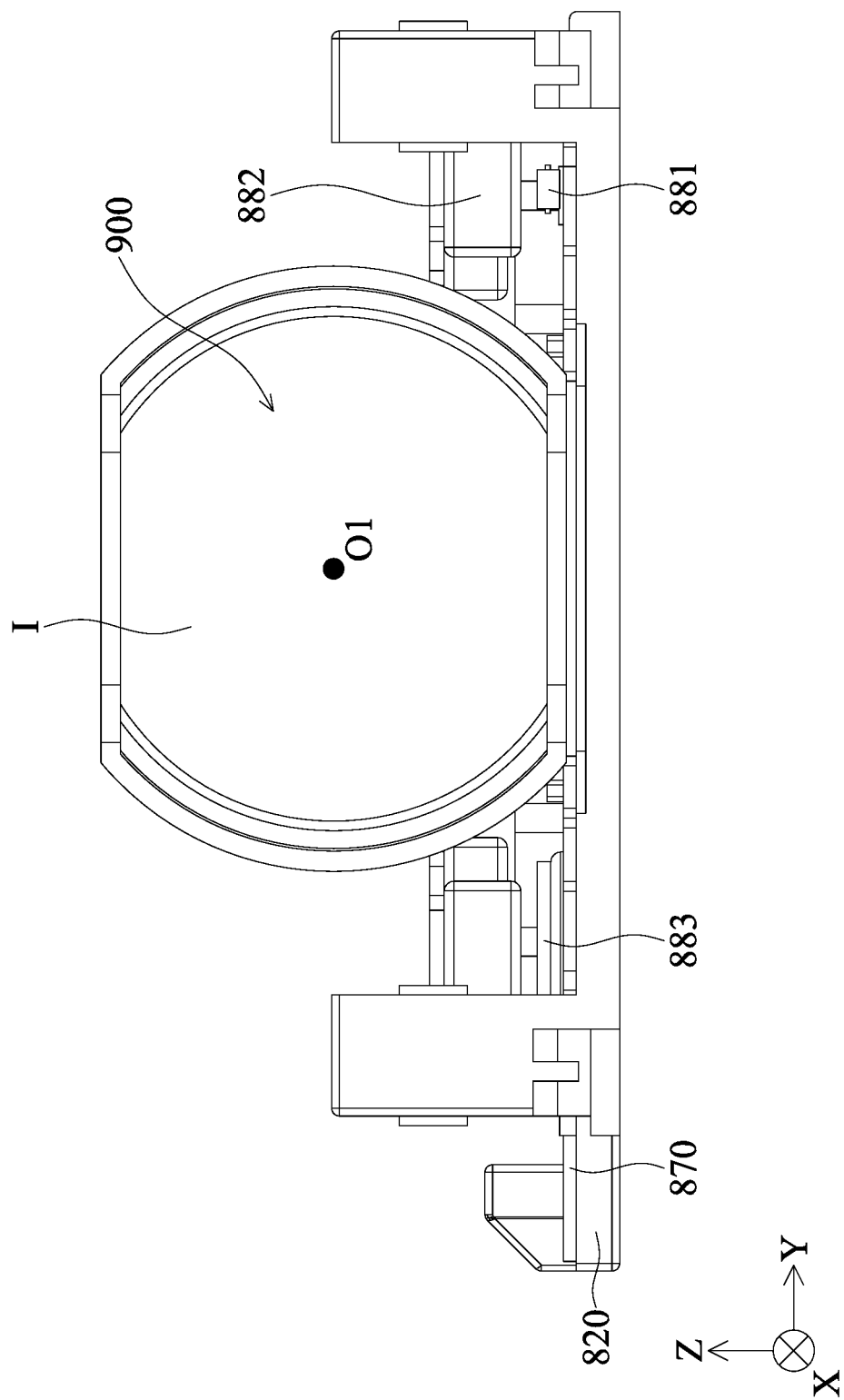
FIG. 9 is a side view illustrating the interior structure of the optical member driving mechanism shown in FIG. 8.

FIG. 8 is a top view illustrating the base 820, the circuit component 870, the second electromagnetic driving assembly 845, the sensing assembly 880 and the optical member 900, and FIG. 9 is a side view illustrating the structure shown in FIG. 8 when viewed in the incident end I. As shown in FIGS. 8 and 9, when viewed in a direction (the Z axis) that is perpendicular to the first optical axis O1, the integrated circuit component 883 of the sensing assembly 880 and the optical member 900 may partially overlap. In the present embodiment, the second magnetic members 846 are tripolar magnets. In some other embodiments, each of the second magnetic members 846 may also be a combination of three magnets.

As set forth above, the embodiments of the present disclosure provide an optical member driving mechanism including a reflection member that is disposed in the housing of the optical member driving mechanism. By means of arranging the reflection member in the housing, the reflection member may be effectively protected and remain undamaged. In addition, the embodiments of the present disclosure provide various structures configured to avoid refection, such as jagged surfaces, barriers, and/or extinction plates, etc. Therefore, the noise may be prevented from entering the image sensor due to reflection, preserving image quality.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical member driving mechanism, comprising:
 a movable portion comprising a carrier for carrying an optical member with a first optical axis;
 a fixed portion, wherein the movable portion is movable relative to the fixed portion, and the fixed portion has a housing and a base, the housing is disposed on the base, and the housing comprises:
 a top surface extending along a direction that is parallel to the first optical axis;
 a first side surface, extending along a direction that is not parallel to the first optical axis from an edge of the top surface, facing an outlet end of the optical member; and
 a second side surface, extending along a direction that is not parallel to the first optical axis from an edge of the top surface, facing an incident end of the optical member,
 wherein the fixed portion further comprises a frame disposed between the carrier and the housing,
 wherein a shortest distance between the optical member and the first side surface is shorter than a shortest distance between the optical member and the second side surface;
 an extinction sheet disposed between the carrier and the optical member and having a porous structure;
 an electromagnetic driving assembly that drives the movable portion to move relative to the fixed portion, wherein the electromagnetic driving assembly comprises a magnetic member and a coil, the coil is disposed on the movable portion, and the magnetic member is disposed on the fixed portion; and
 a first bonding material and a second bonding material, wherein the first bonding material is bonded between the housing and the frame, the second bonding material is bonded between the magnetic member and the frame, and the first bonding material is different from the second bonding material.

2. The optical member driving mechanism as claimed in claim 1, wherein the optical member further comprises a first section and a second section, the first section is closer to the incident end of the optical member than the second section, the first section and the second section are arranged along the first optical axis, and in a direction that is perpendicular to the first optical axis, a largest size of the first section is greater than a largest size of the second section.

3. The optical member driving mechanism as claimed in claim 1, wherein the housing further has:
   a first opening located on the first side surface;
   a second opening located on the second side surface, wherein the first optical axis passes through the first opening and the second opening; and
   a third opening located on the top surface, wherein a distance between the third opening and the first opening is longer than a distance between the third opening and the second opening.

4. The optical member driving mechanism as claimed in claim 1, wherein the housing further has a third side surface and a plurality of holes located on the third side surface, and the third side surface is not parallel to the first side surface or the second side surface.

5. The optical member driving mechanism as claimed in claim 1, further comprising a reflection member disposed in the housing, wherein a shortest distance between the reflection member and the first side surface is longer than a shortest distance between the reflection member and the second side surface.

6. The optical member driving mechanism as claimed in claim 5, wherein the reflection member has a second optical axis that is not parallel to the first optical axis.

7. The optical member driving mechanism as claimed in claim 1, wherein when viewed in the direction that is parallel to the first optical axis, the frame and the carrier at least partially overlap.

8. The optical member driving mechanism as claimed in claim 7, wherein the frame has a first jagged surface disposed to face the base.

9. The optical member driving mechanism as claimed in claim 1, wherein the carrier further comprises a protruding portion that protrudes from the optical member and extends towards the base, and when viewed in the direction that is parallel to the first optical axis, the protruding portion and the optical member at least partially overlap.

10. The optical member driving mechanism as claimed in claim 9, wherein the protruding portion further has a second jagged surface disposed to face the base.

11. The optical member driving mechanism as claimed in claim 1, wherein the magnetic member is a tripolar magnet.

12. The optical member driving mechanism as claimed in claim 1, wherein when viewed in a direction that is perpendicular to the first optical axis, the magnetic member is exposed from the frame.

13. The optical member driving mechanism as claimed in claim 1, wherein the base further comprises a first barrier and a second barrier, the first barrier and the second barrier protrude towards the top surface, and a shortest distance between the first barrier and the first side surface is shorter than a shortest distance between the second barrier and the first side surface.

14. The optical member driving mechanism as claimed in claim 1, wherein the base further comprises a stopping portion disposed between the carrier and the second side surface.

15. The optical member driving mechanism as claimed in claim 14, wherein the base further comprises a metallic member embedded in the stopping portion.

16. The optical member driving mechanism as claimed in claim 1, wherein when viewed in a direction that is perpendicular to the first optical axis, the optical member is partially exposed from the carrier, and a shortest distance between an exposed portion of the optical member and the first side surface is longer than a shortest distance between an unexposed portion of the optical member and the first side surface.

17. The optical member driving mechanism as claimed in claim 1, further comprising a sensing assembly for detecting the movement of the movable portion relative to the fixed portion, wherein when viewed in a direction that is perpendicular to the first optical axis, the sensing assembly and the optical member partially overlap.

18. An optical member driving mechanism, comprising:
   a movable portion comprising a carrier for carrying an optical member with a first optical axis;
   a fixed portion, wherein the movable portion is movable relative to the fixed portion, and the fixed portion has a housing and a base, the housing is disposed on the base, and the housing comprises:
   a top surface extending along a direction that is parallel to the first optical axis;
   a first side surface, extending along a direction that is not parallel to the first optical axis from an edge of the top surface, facing an outlet end of the optical member; and
   a second side surface, extending along a direction that is not parallel to the first optical axis from an edge of the top surface, facing an incident end of the optical member,
   wherein a shortest distance between the optical member and the first side surface is shorter than a shortest distance between the optical member and the second side surface;
   an electromagnetic driving assembly that drives the movable portion to move relative to the fixed portion, wherein the electromagnetic driving assembly comprises a magnetic member and a coil, the coil is disposed on the movable portion, and the magnetic member is disposed on the fixed portion,
   wherein the fixed portion further comprises a frame disposed between the carrier and the housing, and when viewed in a direction that is perpendicular to the first optical axis, the magnetic member is exposed from the frame; and
   a first bonding material and a second bonding material, wherein the first bonding material is bonded between the housing and the frame, the second bonding material is bonded between the magnetic member and the frame, and the first bonding material is different from the second bonding material.

* * * * *